United States Patent [19]
Pidhirny et al.

[11] Patent Number: 6,045,047
[45] Date of Patent: *Apr. 4, 2000

[54] TWO-DIMENSIONAL PART READER HAVING A FOCUSSING GUIDE

[75] Inventors: John M. Pidhirny, Skaneateles; Richard A. Monroe, Syracuse; Michael J. Pileski, Skaneateles; Robert J. Wood, Syracuse, all of N.Y.

[73] Assignee: Welch Allyn Data Collection, Inc., Skaneateles, N.Y.

[*] Notice: This patent is subject to a terminal disclaimer.

[21] Appl. No.: 09/100,575

[22] Filed: Jun. 19, 1998

Related U.S. Application Data

[63] Continuation-in-part of application No. 08/739,040, Oct. 28, 1996, Pat. No. 5,786,586, which is a continuation-in-part of application No. 08/373,656, Jan. 17, 1995, Pat. No. 5,569,902.

[51] Int. Cl.[7] ...................................................... G06K 7/10
[52] U.S. Cl. .................... 235/472.01; 235/454; 235/483; 250/237 R; 250/239
[58] Field of Search .............................. 235/472.01, 454, 235/483, 455, 462.45; 250/237 R, 239, 235

[56] References Cited

U.S. PATENT DOCUMENTS

| | | | |
|---|---|---|---|
| 4,107,540 | 8/1978 | Hillman | 250/566 |
| 4,210,802 | 7/1980 | Sakai | 235/483 |
| 4,282,425 | 8/1981 | Chadima, Jr. et al. | 235/462.01 X |
| 5,191,199 | 3/1993 | Elko | 235/483 |
| 5,285,056 | 2/1994 | Tedesco et al. | 235/438 X |
| 5,313,373 | 5/1994 | Bjorner et al. | 362/19 |
| 5,331,176 | 7/1994 | Sant'Anselmo et al. | 235/472.01 X |
| 5,408,084 | 4/1995 | Brandorff et al. | 235/472.01 X |
| 5,567,934 | 10/1996 | Zheng et al. | 250/239 X |
| 5,569,902 | 10/1996 | Wood et al. | 235/472.01 |
| 5,602,379 | 2/1997 | Uchimura et al. | 235/472.01 X |
| 5,786,586 | 7/1998 | Pidhirny et al. | 235/472.01 |

FOREIGN PATENT DOCUMENTS

| | | |
|---|---|---|
| 55-56327 | 11/1981 | Japan . |
| 5-54408 | 9/1994 | Japan . |

*Primary Examiner*—Michael G Lee
*Attorney, Agent, or Firm*—Wall Marjama Bilinski & Burr

[57] ABSTRACT

An optical reader is suitable for reading 2-dimensional indicia. The optical reading device, that may include a bar code reader, comprises a guide whose length along the optical reader optical axis is such that when that guide contacts the part or equipment surrounding the indicia to be read, that indicia is within the optical reader depth of field. The reader comprises a housing having therein a source of illumination and optics for producing a diverging beam for illuminating indicia. A spacing element transparent guide is removably attached to the housing, and does not block indicia. The line of contact of the guide with the data carrier is substantially fully visible to the operator, who can thus confirm that the guide is in proper operating position relative to the indica prior to initiating a reading operation. A reading operation can be initiated by pressing on the guide to actuate a switch, or on a manual trigger.

24 Claims, 9 Drawing Sheets

TWO-DIMENSIONAL PART READER HAVING A FOCUSSING GUIDE

CROSS REFERENCE TO RELATED APPLICATIONS

This is a continuation-in-part of U.S. application Ser. No. 08/739,040 filed Oct. 28, 1996, now U.S. Pat. No. 5,786,586 which in turn is a continuation-in-part of U.S. application Ser. No. 08/373,656 filed Jan. 17, 1995, now U.S. Pat. No. 5,569,902. The teachings of U.S. application Ser. No. 08/739,040 and U.S. Pat. No. 5,569,902 are incorporated herein by reference.

BACKGROUND OF THE INVENTION

1. Field of the Invention

This invention relates to a hand held optical reading device for reading indicia on the surface of a data carrier substrate, particularly to a hand held optical reading device that facilitates the focussing of the optical device relative to a small 2D target.

2. Description of the Prior Art

Two dimensional 2D bar code symbols are now common in the art. Symbologies such as PDF417 are characterized by stacked rows of data that in aggregate contain encoded information. Usually redundant information is included for error detection and correction. PDF417 is described in Wang, U.S. Pat. No. 5,243,655. Other two-dimensional symbologies are known. For example, Allais, U.S. Pat. No. 4,794,239 discusses stacked linear bar codes, and proposes a multi track symbology. Other 2D bar code symbols use non-stacked or matrix symbologies. An example of such a matrix symbology is described in U.S. Ser. No. 08/441,446, filed May 15, 1995.

Known bar code reading devices are capable of reading symbols even when the scanning axis of the reader is not rotationally aligned with the rows and columns. In the case of PDF417, this can be accomplished by "scan stitching", which utilizes positional information that is encoded in each row to identify a given row being scanned. Another approach, described in European Patent Application EP 0 385 478, involves transferring the optical pattern into a memory, and then evaluating the contents of the memory to determine the angular orientation of the symbol. Nevertheless it is more efficient to read the symbol in alignment with the active optical elements in the scanning device.

It is desirable to operate portable bar code scanners with light sources that consume low power, such as light emitting diodes. These devices have carefully optimized optical systems for creating an illuminating beam with sufficient angular divergence to read a bar code symbol that is wider than the optical window of the scanner, yet limit off-angle falloff of illumination to acceptable limits. Such scanners cannot be positioned too far from the symbol and still read effectively. Also, they often do not tolerate deviation of the scanner's optical axis from a normal to the surface of the target, because the working depth of field is intentionally kept small, in order to take advantage of the limited illumination available.

Two dimensional bar code symbols and other indicia on parts and equipment are becoming increasingly prevalent. The applications include automotive mechanical component housing and electronic component packaging. The smaller ones of these indicia range in size from ¼" to as small or smaller than 1/32" in any one dimension.

Existing hand held indicia optical readers, including bar code readers, are not well suited for reading small indicia. One reason is that small indicia often appear on mechanical and electronic components which do not provide ready access to hand held devices. Another reason is that existing optical readers are wide angle devices and provide inadequate resolution of small marks or high density indicia on their imagers. The optical systems of these optical readers do not allow these optical readers to simultaneously both resolve small indicia and focus small indicia.

Optical reading devices that can resolve small marks (or indicia) have very shallow depth of field lens systems. These optical reading devices that can resolve small marks have both very shallow relative and absolute depth of field in relation to the depth of field of wide angle two dimensional bar code scanners reading standard bar codes. Optical reading devices that can resolve small marks have a small permissible range of distance between their lens system and the target for the target to be in focus.

Some bar code scanners are wand like devices that can be placed in close proximity to the target, and can resolve small marks. These scanners, however, read only linear one dimensional bar codes, because of their extreme proximity to the target. They are pixel readers, and are inadequate for two dimensional indicia.

Some bar code scanners have aligning members designed to help in aligning bar code at a pre-determined angle or designed to help in aligning the target in the field of view of the optical system, e.g. Sakai, U.S. Pat. No. 4,210,802. Sakai, U.S. Pat. No. 4,210,802, which discloses a scanner in which two parallel guide rails appended to the front of a housing are proposed to define a scanning region for the image sensor. These scanners are wide angle devices with large depth of field ranges and alignment systems that assume that the alignment device contacts the underlying substrate on the same plane as the indicia. The Sakai device is specifically designed to align 1D bar code in a plane perpendicular to the optical axis. 1D imagers require that bar code scanners are positioned on a perpendicular fixed orientation with respect to the plane of the one dimension bars, and parallel to the plane of the target, and not rotated freely relative to their indicia. These apparatus do not specifically address the problem of focussing on small 2D indicia, particularly a small 2D indicia target located on a relatively inaccessible component part within a device.

SUMMARY OF THE INVENTION

It is therefore a primary object of the present invention to provide an improved optical bar code reader for two dimensional indicia that provides a positional and directional indicator to the operator that the reader is properly positioned and directed with respect to the indicia being read.

It is another object of the present invention to provide an actuator for the optical reader that cooperates with the positional and directional indicator to initiate a reading operation.

These and other objects of the present invention are attained by an optical reader of the type having a source of illumination, a 2D image sensor, transmission optics for directing light emanating from the source onto a 2D indicia, and receive optics for directing light returning from the indicia onto the 2D image sensor. The reader comprises a housing having therein a source of illumination for producing a beam for illuminating a data carrier having indicia thereon; optics for diverging the beam outward of the housing; and a guide disposed on a front portion of the housing. The guide is sized along the optical axis so that when it contacts the substrate underlying indicia to be read, the indicia is in the depth of field of the reader. The guide may have a silhouette that is thin and does not protrude away from the optical axis except to permit imaging of indicia, so that the scanner has optimal access to encumbered parts and indicia.

In one aspect of the invention a switch engages when the guide is pressed against the data carrier to initiate a reading operation. The switch can also actuate the source of illumination.

In another aspect of the invention, the guide is removable from the housing, and can be interchanged with an alternate guide that is dimensioned to surround different indicia or provide for a different depth of field for different density indicia.

It is still another object of this invention to provide an apparatus for positioning an optical reading device at the correct distance from a 2D target, particularly a small target relative to the distance from the optical reading device, so that the target is within focus of the optical reading device, and may be rotated relative to the plane of the 2D indicia, so that the optical reading device may by positioned in an accessible way relative to the indicia and the indicia's underlying equipment or part. It has no bearing what angle the indicia target is presented to the optical reader as long as the target is within the field of view of the optical reader. The reader is capable of reading indicia on non-planar surfaces such as rounded, raised, recessed, concave, and convex surfaces, so long as the indicia is within the depth of field of the optical reader.

It is another object of this invention to provide a means for positioning an optical reading device at the correct distance from a target, particularly a small target relative to the distance from the optical reading device, wherein the surrounding part surface is on a plane different from the target plane.

It is yet another object of this invention to provide an apparatus for positioning a scanner, as a specific type of optical reading device, at the correct distance from the indicia, to ensure that the indicia is within the reader depth of field and/or operating range.

These and other objects are attained in accordance with the present invention wherein there is provided an improved hand held optical reader with imaging capability that includes a guide of a length along the lens system optical axis such that during a reading operation the guide contacts a surrounding part of the target to be read and the target is in focus of the lens system.

BRIEF DESCRIPTION OF THE DRAWING

For a better understanding of these and other objects of the present invention, reference is made to the detailed description of the invention which is to be read in conjunction with the following drawings, wherein.

DESCRIPTION OF THE INVENTION AND THE PREFERRED EMBODIMENT

Figure 1:
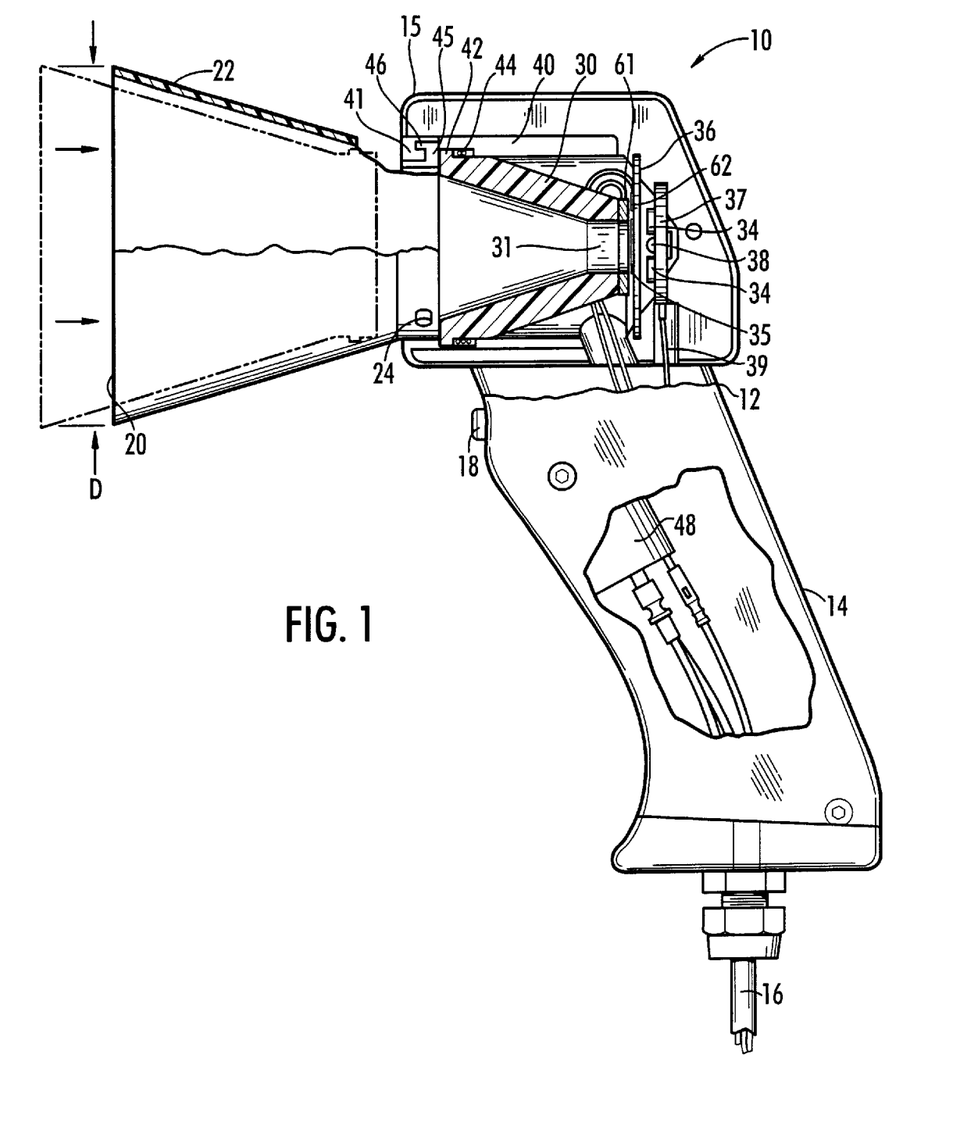
FIG. 1 is a composite side view of a bar code scanner embodying the teachings of the invention.
Figure 2:
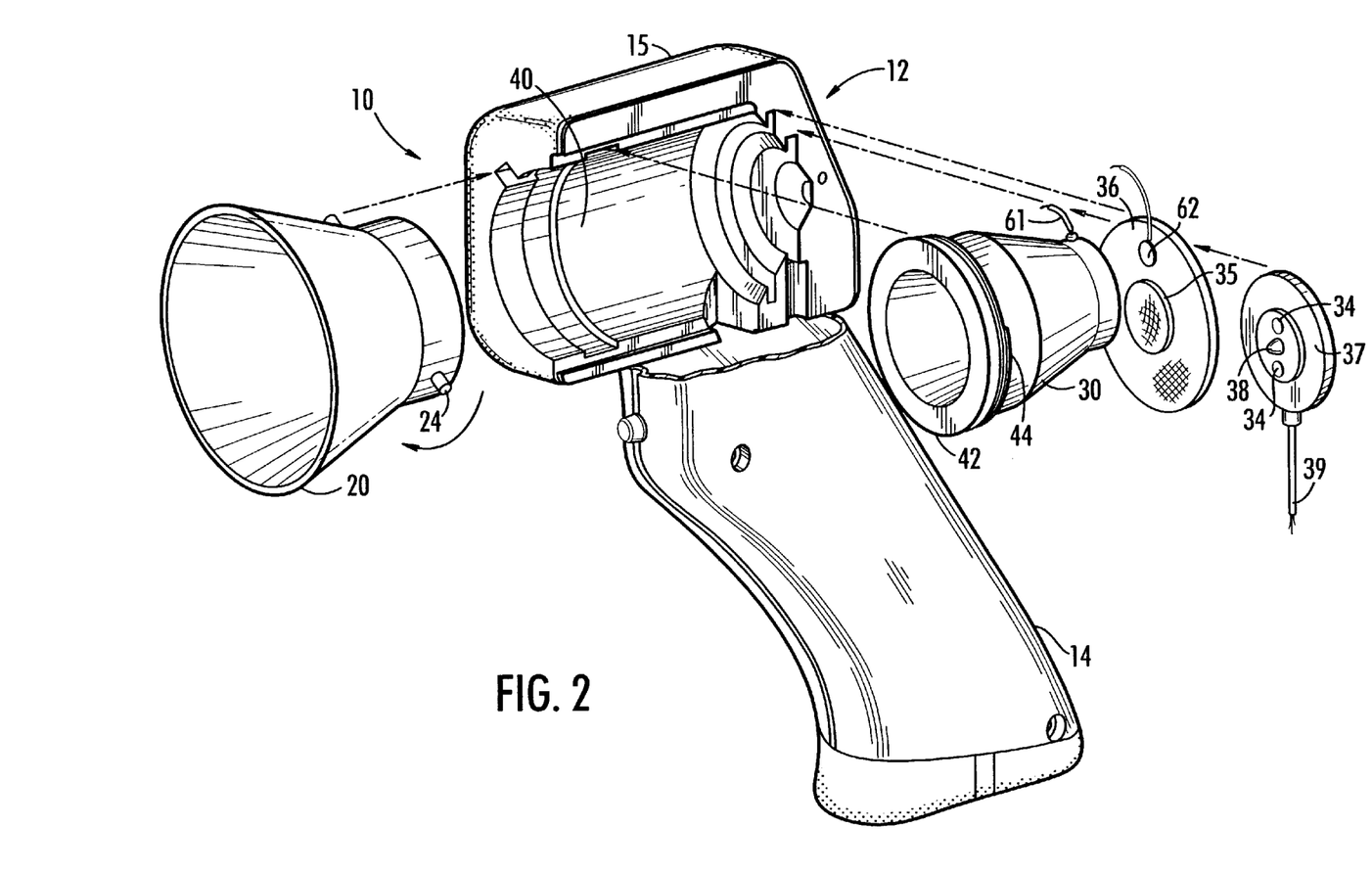
FIG. 2 is a perspective view, partially exploded, of the scanner shown in FIG. 1.

Turning now to the drawing, and in particular to FIGS. 1 and 2 thereof, there is shown a hand-held optical reader 10. The reader has a housing 12, which includes a hand-grip 14, and a reader head 15. A depressible switch 18 is provided on the front of the hand-grip 14, which actuates the device when depressed by an operator's finger. A cable 16 attaches to the base of the hand-grip 14 for supplying power and for transmission of signals between the reader and a host device (not shown), which can be a point-of-sale terminal, or a computer.

An assembly 37 is disposed in the rear of the reader head 15. Mounted thereon is a light source 38 which can be an LED, microlaser or the like, and an imaging device such as a photodiode, CCD array, CID, or CMOS imaging array 34, which must be optically shielded from the light source 38. Shielding can be accomplished by suitable opaque thin film barriers (not shown) appropriately disposed in the photodetectors, if they are realized as an integrated circuit, or by an appropriate configuration of the laser's containment or lensing system. Alternatively, the light source 38 can be mounted behind the imaging device 34 to prevent direct transmission of light therebetween. Power and signals are communicated to and from the assembly 37 via a cable 39 leading to suitable signal processing electronics 48, which can include a decoder and a microcomputer. A transceiver, well known in the art, can also be incorporated into the electronics 48, for communication to and from a remote host. In the case where a transceiver is included, then cable 16 will generally be limited to carrying power only, or it could be omitted entirely, and a battery (not shown) placed in the handle portion 14 for supplying power to the unit.

Light emitted by the light source 38 strikes a negative lens 35, which is mounted on a wheel or disk 36. Light exiting the lens 35 continues outwardly through the housing 12 at an angle of divergence. A plurality of lenses can be mounted on the wheel 36, and can be selected in order to achieve a predetermined angle of divergence. The support member 30 is configured as a spacer which in this present embodiment comprises a frustum of a cone, having a small rear end disposed proximate the lens 35, and a wide front end disposed near the front of the reader head 15. An optical element 31 can optionally be placed in the rear end of the support member 30 to further adjust the light beam produced by the light source 38 and the lens 35, as may be required. The support member 30 is stabilized by an outer retainer 40, which is mounted in the housing 12.

Figure 6:
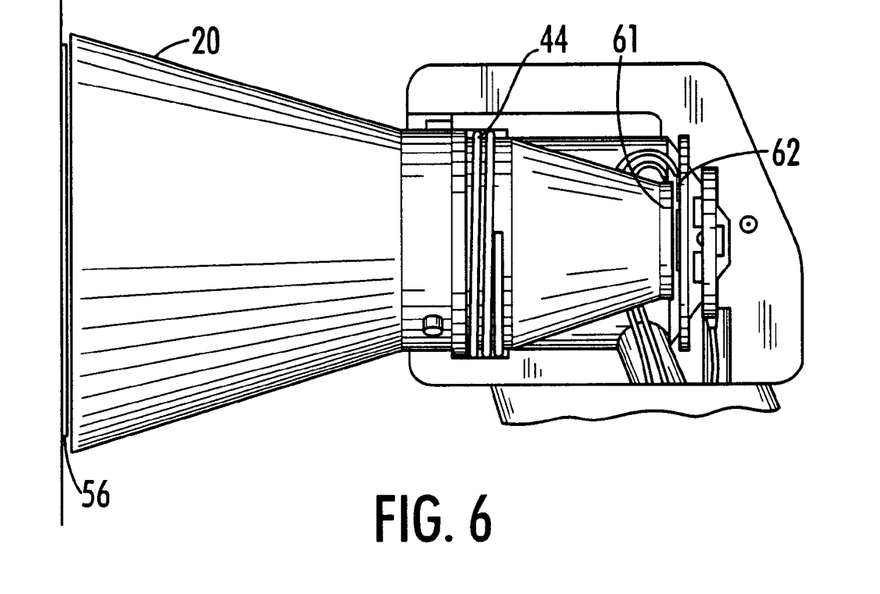
FIGS. 6 and 7 are enlarged cut-away side views of the reader head of FIG. 1, showing the cone assembly in extended and retracted positions respectively.
Figure 7:
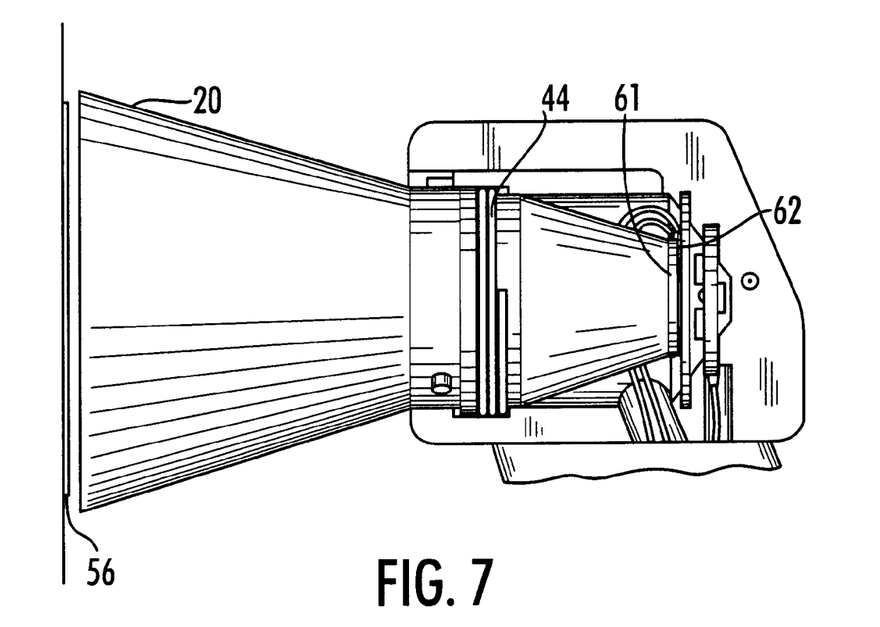

A transparent spacing element or guide 20 is disposed on the front portion of the reader head 15. The guide 20 is configured as a frustum of a cone. It removably attaches to the retainer 40 by bayonet pins 24 and is inserted into a bayonet adapter 41 located at the front end of the reader head 15, so that it aligns with the support member 30. The bayonet pins 24 are carried in bayonet tracks 45. A spring 44 disposed in a recess of the retainer 40 bears on a shoulder 42 of the support member 30, urging the support member into forward movement. The support member 30 abuts the bayonet adapter 41, and forces the pins 24 into terminal indents 46 where they are locked in place. The spring 44 also functions to displace the assembled support member 30 and transparent guide 20 in a forward direction, so that the transparent guide 20 is in an extended position with respect to the reader head 15. The guide 20 could also be secured to the reader head 15 by other conventional methods, such as threads, or snap fittings. As best seen in FIGS. 6 and 7, the assembled device can also be actuated by pressing it against a data carrier. In FIG. 6 the guide 20 is disposed near a data carrier 56, and, as a result of the unopposed action of spring 44, is in a fully extended position. In FIG. 7 the guide 20 is applied to the data carrier 56 and is subjected to pressure exerted by an operator (not shown). The force exerted by the data carrier 56 on the guide 20 counteracts the spring 44, and moves the transparent guide 20 and the support member 30 rearward a short distance into the housing 12. Switch contacts 61, 62 disposed on the support member 30 and on a non-movable surface such as disk 36 are thereby brought together to electrically actuate the unit in the same manner as depressible switch 18. The light source 38 is preferably disabled until one of the switches is closed for safety and to conserve power. As is known in the art, other components of the reader can also be enabled and disabled according to the state of the switches, such as the electronics 48, and the imager 34. While actuation of the device is responsive to a mechanical contact switch, it will be understood by those skilled in the art that other types of switches can be substituted for contacts 61, 62. For example optical beam interruption switches could be employed, as could various pressure sensors and proximity sensors using principles such as, for example, change in capacitance. The result in each case is that the device is actuated in response to increased mechanical pressure exerted by the operator pushing the reader against the data carrier.

Figure 3:
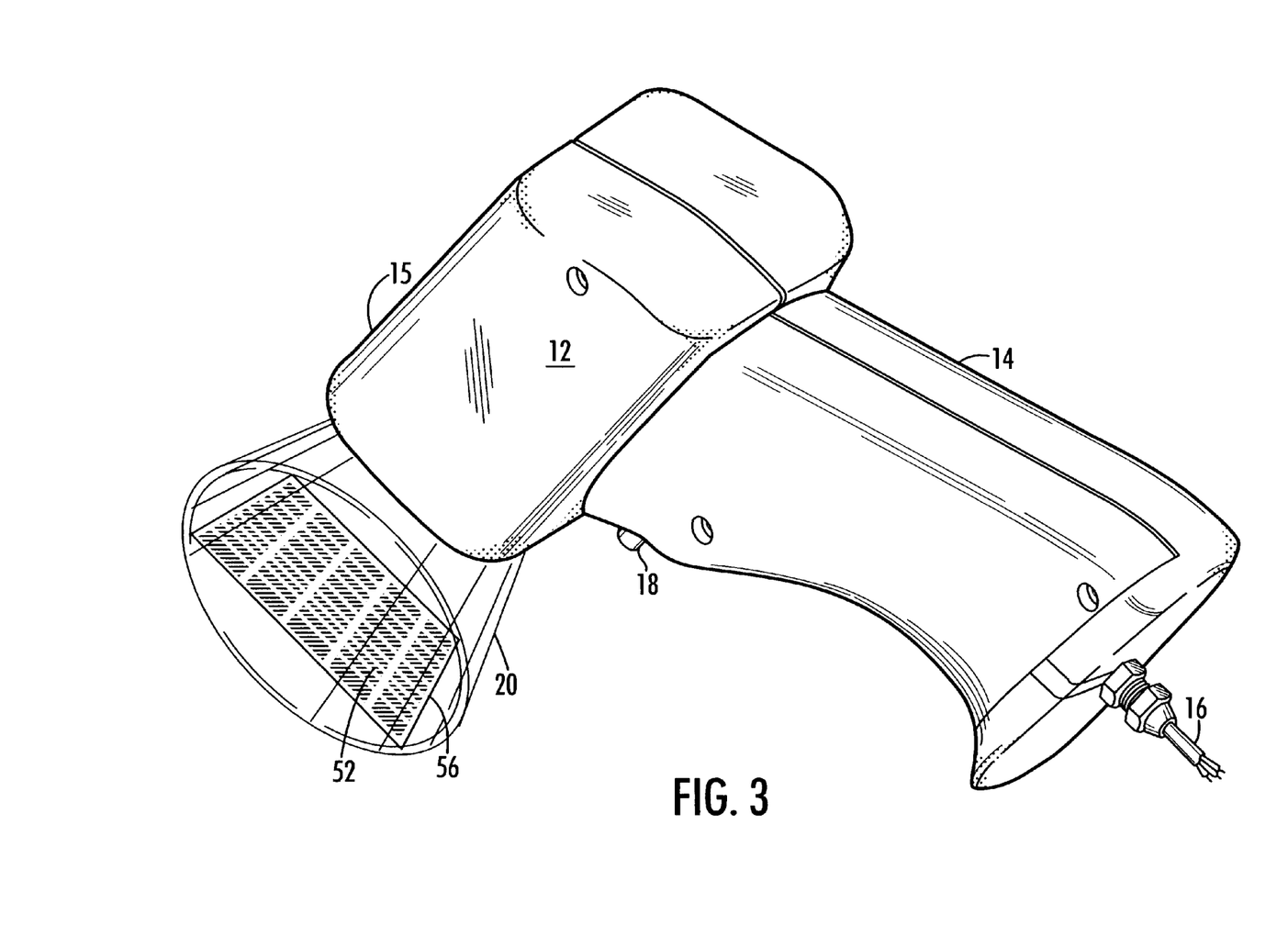
FIG. 3 is a perspective view of the scanner shown in FIG. 1 in a operating position confronting a bar code symbol.

Referring now to FIG. 3, the transparent guide 20 extends outwardly of the housing 12, and is dimensioned to encompass an indicia 52 of predetermined type when the transparent guide 20 is placed on a data carrier 56. The indicia can be, for example, a two-dimensional bar code symbol.

Figure 4:
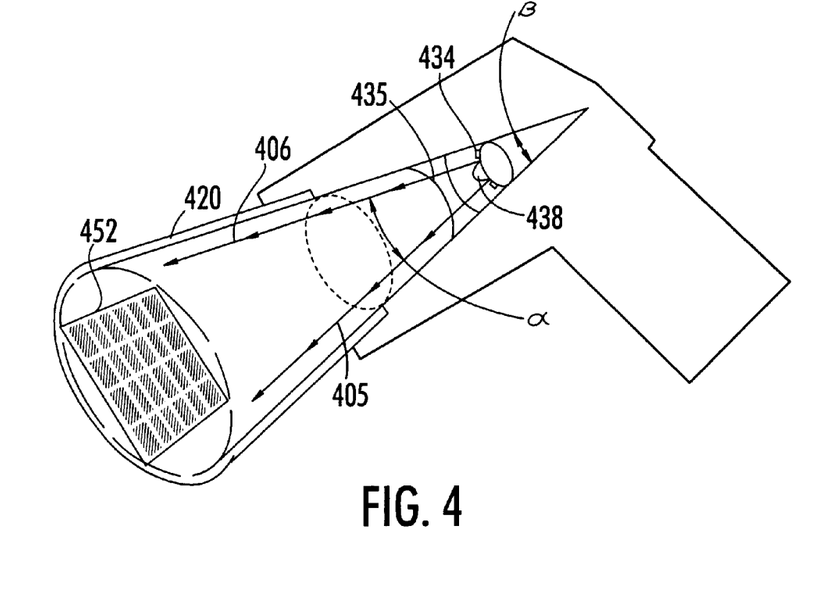
FIG. 4 is a diagrammatic sectional view, with detail omitted, taken through line 4—4 of FIG. 1.
Figure 5:
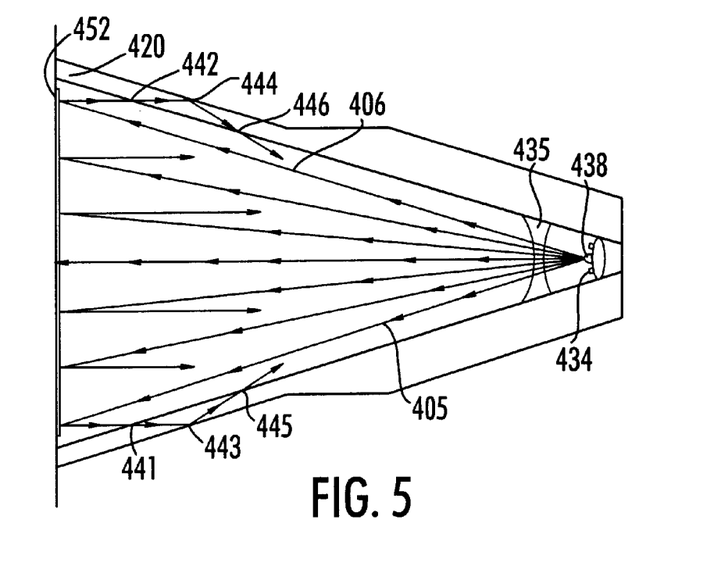
FIG. 5 is an diagrammatic illustration that is helpful in understanding the operation of a scanner in accordance with the invention.

Turning now to FIG. 4 there is shown a diagram illustrating the function of a transparent guide 420 which is configured as the frustum of a cone, and placed on a data carrier 452. Light radiation emitted by a suitable light source such as one or more lasers or LEDs 438 emerges from a negative lens 435 at an angle of divergence α a that is equal to the conical angle β of the frustum. This light source can be of any suitable type; a 660 nm laser is suitable. The guide 420 is constructed of a transparent material such as glass or plastic. The source 438 is aligned with the axis of the guide 420, so that the negative lens 435 aligned therewith projects a beam of light that diverges parallel to the walls of the frustum, as shown by marginal rays 405, 406, and it will be evident that the incident beam is fully encompassed by the wall of the guide 420, which is proximate the marginal rays 405, 406. Light incident on the data carrier 452 is scattered in accordance with well known substrate interactions with the data carrier 452, and most of it returns in the general direction of the lens 435, eventually reaching a photodetector 434. In FIG. 5 it will be seen that the incident light rays are scattered in various directions. Some of the scattered rays strike the internal wall of the guide 420, for example at points 441, 442 at less than a critical angle, so that the light is internally reflected at points 443, 444 to reenter the interior of the guide at points 445, 446. Only a small amount of light is transmitted through the outer surface of the transparent guide 420. An observer viewing the guide thus sees a dim red glow when the laser is actuated.

Turning again to FIG. 1, it is desirable that the diameter at the front end of the guide 20, indicated by dimension D, exceed the vertical dimension of the reader head 15. Also the diameter preferably exceeds the width dimension of the reader head. The operator, positioned generally behind the reader 10, can thus observe substantially the entire circumference of the front end of the guide 20. Except for the relatively narrow profile of the hand grip 14, the housing 12 does not block the operator's view of the intersection of the front end of the guide 20 with the data carrier. Alternate guides 20 can be provided for reading symbols of different sizes and at different working distances.

To use the device, the operator attaches a suitable guide 20 to the reader head 15, and positions the front end of the guide 20 on a data carrier having a symbol thereon, and holds his/her eyes behind the reader head. While maintaining an essentially stationary position, the operator then views the front end of the guide 20, and confirms that the indicia to be read is fully encompassed within the perimeter of the guide. The reader 10 is then actuated either by depressing the switch 18, or by pressing the device against the data carrier and causing the guide 20 and the support member 30 to retract into the housing and close switch contacts 61, 62 to initiate a reading operation.

Figure 8:
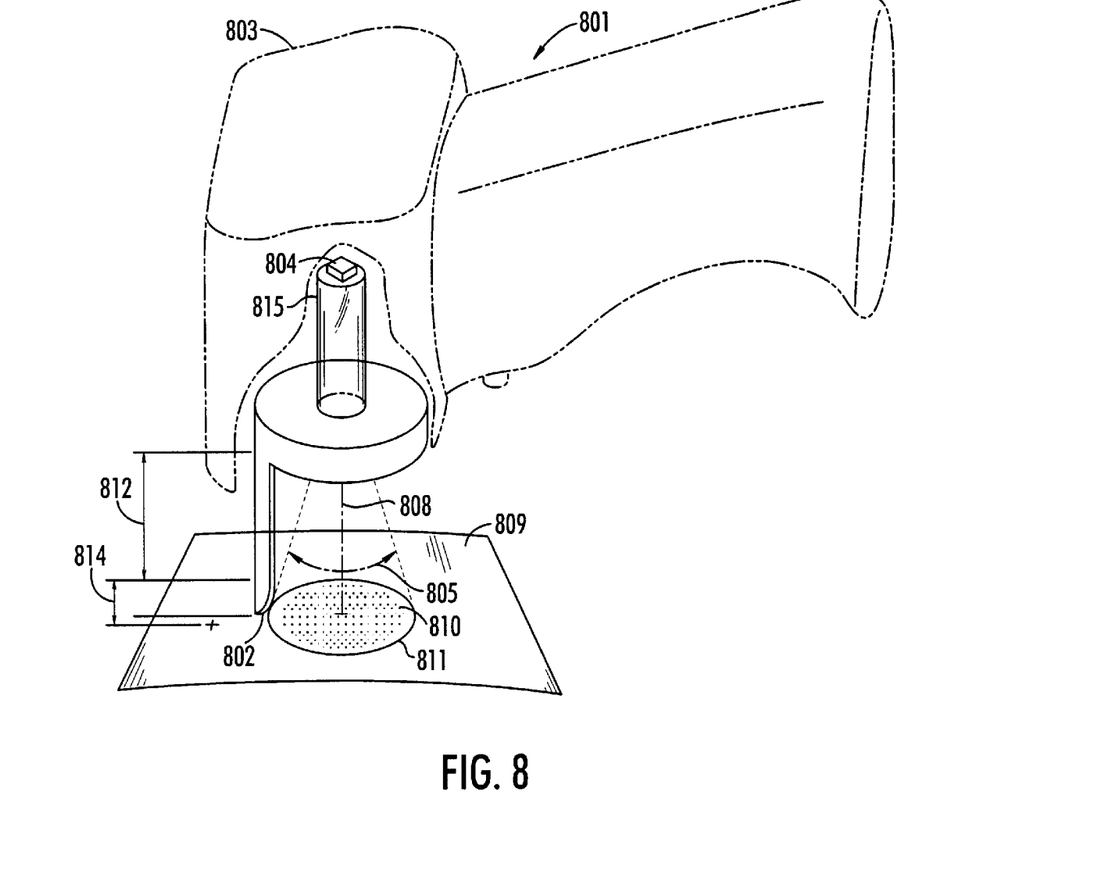
FIG. 8 is a diagrammatic illustration of the focussing aspect of this invention.

FIG. 8 contains an embodiment of the focussing aspect of this invention. In the description that follows, as well as the claims to be presented hereinafter, it is convenient to introduce some nomenclature. The term "mark target" refers to the indicia marking to be read, and the surrounding area of that marking, in a plane perpendicular to the optical axis that is within the field of view of the lens. The term "equipment target" refers to the plane perpendicular to the optical axis that passes through the point on the surrounding equipment or data carrier that the guide apparatus described hereinafter contacts.

Referring to FIG. 8, an optical reader 801 embodies the principles of an aspect of this invention. There is provided a guide apparatus 802, a housing 803, a lens assembly 815, a 2D imager 804, such as a CCD, comprising the optical reader. The optical reader has the optical properties of a depth of field 814, an optical axis 808, and angular field of view 805.

Referring to FIG. 8, there is provided the guide apparatus 802 mounted on the housing 803, so that its position relative to the optical reader lens assembly 815 is fixed. The distance from the rear portion of the lens assembly to the imager 804 is fixed so that for a given lens aperture and depth of field 814, the angular field of view 805 of the lens assembly is also fixed. The guide has a proximal end projecting outward from the optical reader along the optical reader optical axis 808. The guide is an elongated member to contact a component part within a device that is difficult to reach.

The guide apparatus 802 makes contact with the equipment target (or data carrier) 809 during a reading operation of the indicia 810 on a mark target 811. The distance to the proximal end of the guide apparatus 802 along the projection of the guide apparatus on the optical axis is at a distance 812 such that the mark target is in the depth of field 814 of the optical reader when the proximal end of the guide apparatus 802 is in contact with the equipment target. This description presumes a distance between the equipment target and the mark target that will not vary by more than the depth of field of the optical reader.

If there is any difference in the presumed distance above, that difference is compensated by using a guide apparatus whose length to its proximal end along the projection of the guide on the optical takes into account that difference, so that the length of the guide apparatus is offset that length difference, and the mark target is always within focus of the lens assembly, even for indicia displaced along the optical axis from their underlying equipment target.

Figure 9:
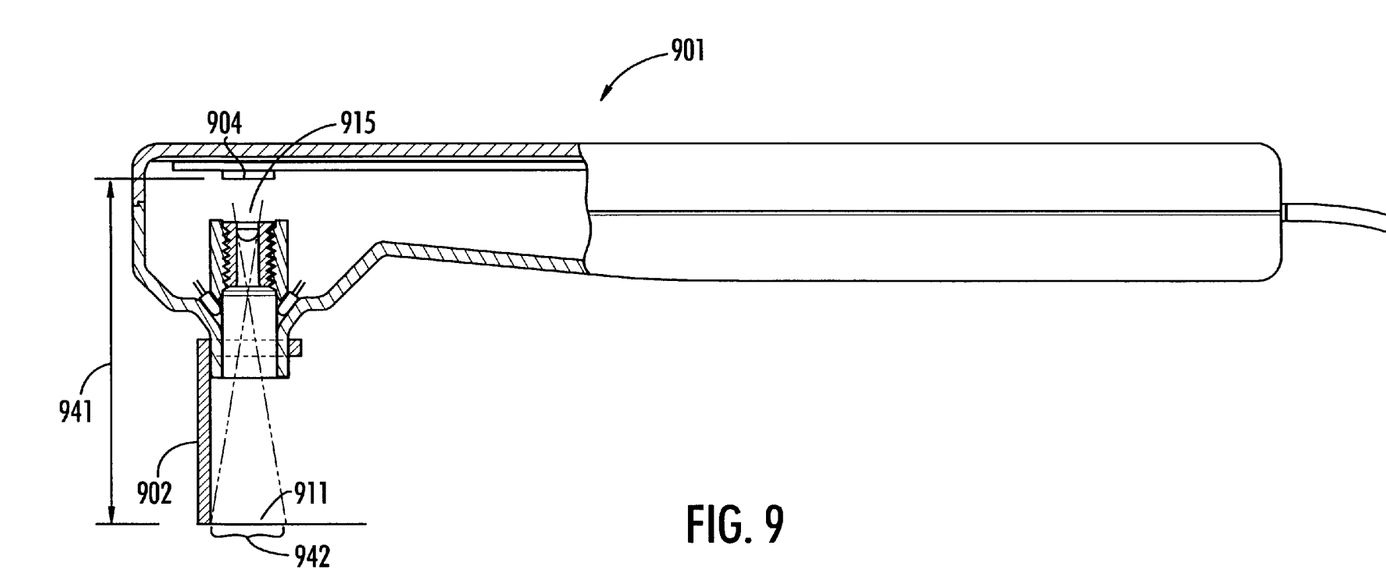
FIG. 9 is a partial cut-away side view of a an optical reader having a focussing guide set-up to read in-focus small indicia.

Referring to FIG. 9, an optical reader 901 having a guide apparatus 902 for ensuring that an indicia is within focus of the lens assembly 915 can accordingly properly read very small indicia. For instance, a mark target 911 having indicia smaller than 10 mm can easily be read by a reader 901 of this invention, wherein the distance 941 from the imager 904 to the target 911 is 33 mm for a lens having a 4–5 mm lens train and a 15 mm viewing area 942.

Figure 10A:
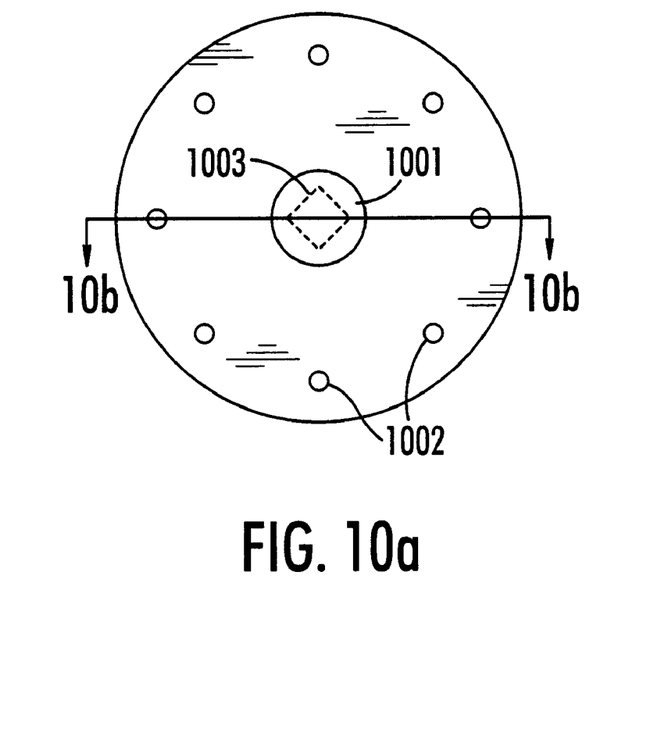
FIGS. 10a and 10b are diagrammatic illustrations of an illumination source for an optical reader with a focussing capability.
Figure 10B:
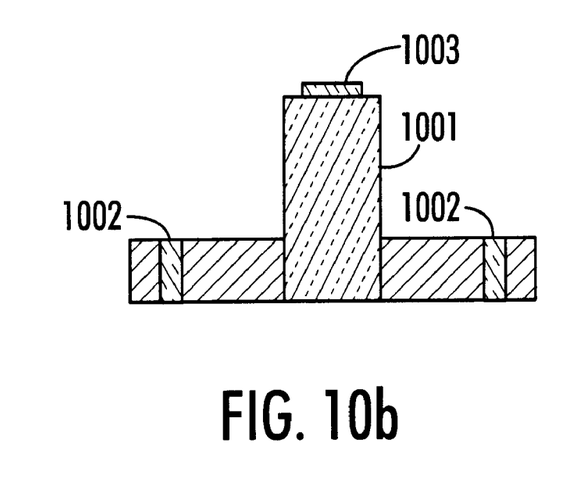

FIGS. 10a and 10b present another aspect of the invention, namely a source of illumination for illuminating the indicia to be read. Small indicia on equipment and parts have a particular need for supplied illumination: to help target the indicia, to uniformly illuminate the indicia for proper exposure on the imager, and to permit a smaller aperture in the lens assembly to that the lens assembly has a greater depth of field than it otherwise would have. FIG. 10a presents a view from the front of a lens assembly 1001, of a light source which in this embodiment is an LED array 1002 that completely encircles the imager 1003, thus providing bright, uniform light on the indicia, and back through the lens assembly onto the imager. FIG. 10b is a cut away side view of the lens assembly 1001, the LED array 1002, and the imager 1003.

Figure 11:
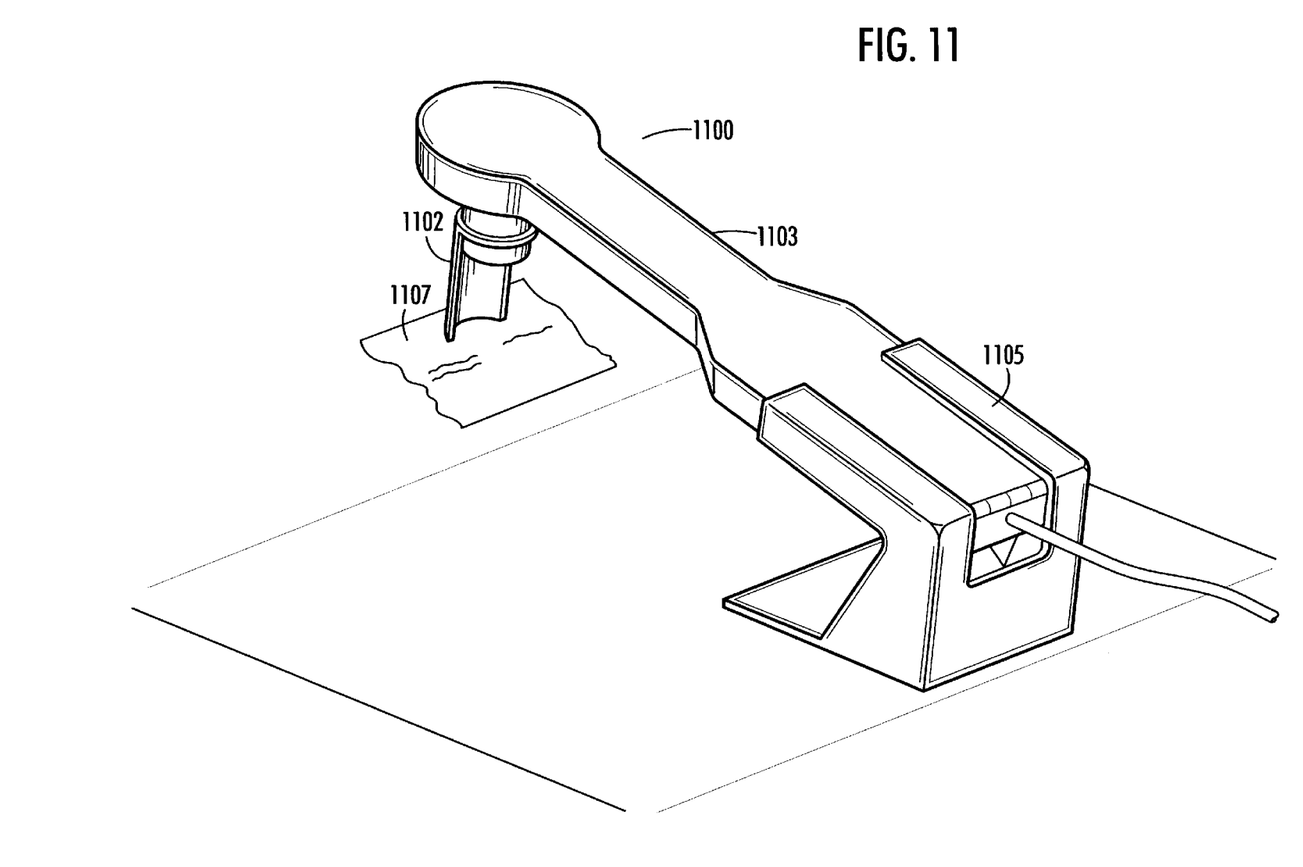
FIG. 11 is a view of an optical reader secured to a holder for hands free operation by an operator.

Referring to FIG. 11, the optical reader 1100 of this invention includes a guide apparatus 1102 and a housing 1103, and may be secured by a holding device 1105 of this invention, for an optical reader operator freely securing the optical reader 1100 by the holding device 1105, and not having to cause the optical reader 1100 to be supported by him or her self, or by another person. The operator is thereby free for bringing and positioning a mark 1107 to be read to the guide 1102 within the field of view of the optical reader, by moving the mark 1107 into contact with the guide 1102, rather than bringing and positioning the optical reader 1100 to that mark 1107, as he or she might do if he or she were holding the optical reader 1100.

While this invention has been explained with reference to the structure disclosed herein, it is not confined to the details set forth and this application is intended to cover any modifications and changes as may come within the scope of the following claims:

What is claimed is:

1. A hand held optical reader comprising:
   a housing;
   a lens assembly attached to said housing, said lens assembly having, an optical axis, and depth of field;
   an imaging assembly mounted to said housing in image receiving relationship to said lens assembly;
   a guide disposed on a front portion of said housing for establishing a distance between said lens assembly and an equipment target that is displaced a predetermined distance from a mark target, said guide having a proximal end adapted to be mounted on said housing, and a distal end adapted to contact the equipment target;
   wherein the length of said guide is such that the positioning of said distal end on said equipment target assures that said mark target is within said depth of field of said lens assembly.

2. The hand held optical reader of claim 1, further comprising a means for removably attaching said guide to said housing, whereby said guide can be interchanged with a guide having a different length.

3. The hand held optical reader of claim 1, wherein said guide comprises an elongated spacer member.

4. The hand held optical reader of claim 1, further comprising a holding device for holding said optical reader for hands free use, whereby an operator can position said mark target relative to said optical reader by moving said equipment target into contact with said guide.

5. The housing according to claim 1, further having a source of illumination for illuminating said mark target.

6. The source of illumination of claim 5, wherein said source of illumination is a plurality of light sources disposed about said imager for illuminating said mark target.

7. The hand held optical reader according to claim 1, further comprising a switch means for actuating said reader to initiate a reading operation when said guide presses on said equipment target.

8. A hand held optical reader comprising:
   a housing;
   a lens assembly attached to said housing, said lens assembly having optical axis, and a depth of field;
   a 2-dimensional (2D) image sensor mounted within said housing in image receiving relationship to said assembly;
   a guide disposed on a front portion of said housing for establishing a distance between said lens assembly and a 2-dimensional (2D) indicia positioned on a substrate, said guide having a proximal end adapted to be mounted on said housing, and a distal end adapted to contact said substrate;
   whereby the positioning of said distal end on said substrate assures that said indicia is within said depth of field of said lens assembly.

9. The hand held optical reader of claim 8, further comprising a means for removably attaching said guide to said housing, whereby said guide can be interchanged with a guide having a different length.

10. The hand held optical reader of claim 8, wherein said guide comprises an elongated spacer member.

11. The housing according to claim 8, further having a source of illumination for illuminating said indicia.

12. The source of illumination of claim 11, wherein said source of illumination is a plurality of light sources disposed about said imager for illuminating said indicia.

13. The hand held optical reader according to claim 8, further comprising a switch means for actuating said reader to initiate a reading operation when said guide presses on said substrate.

14. The hand held optical reader of claim 13 in which said 2D indicia is smaller than 10 mm in any one dimension.

15. The hand held optical reader according to claim 8 in which said indicia is smaller than 10 mm in any one dimension.

16. The hand held optical reader according to claim 8, further comprising a holding device for holding said optical reader for hands free use, whereby an operator can position said mark target relative to said optical reader by moving said equipment target into contact with said guide.

17. A hand held optical reader for reading a 2D indicia comprising:
   a housing;
   a lens assembly attached to said housing, said lens assembly having, an optical axis, and a depth of field;

a matrix image sensor image sensor within said housing in image receiving relationship to said assembly;

a guide disposed on a front portion of said housing for establishing a distance between said lens assembly and an equipment target that is displaced a predetermined distance from a mark target, said guide having a proximal end adapted to be mounted on said housing, a distal end adapted to contact with the equipment target, and a predetermined distance along the projection of the guide on the optical axis;

whereby the positioning of said distal end on said equipment target assures that said mark target is within said depth of field of said lens assembly.

18. The hand held optical reader of claim 17, further comprising a means for removably attaching said guide to said housing, whereby said guide can be interchanged with an alternate guide.

19. The hand held optical reader of claim 17, wherein said guide comprises an elongated spacer member.

20. The hand held optical reader of claim 17 in which said indicia is smaller than 10 mm in any one dimension.

21. The housing according to claim 17, further having a source of illumination for illuminating said mark target.

22. The source of illumination of claim 21, wherein said source of illumination is a plurality of light sources disposed about said imager for illuminating said mark target uniformly.

23. The hand held optical reader according to claim 17, further comprising a switch means for actuating said reader to initiate a reading operation when said guide presses on said equipment target.

24. The hand held optical reader according to claim 17, further comprising a holding device for holding said optical reader for hands free use, whereby an operator can position said mark target relative to said optical reader by moving said equipment target into contact with said guide.

* * * * *

UNITED STATES PATENT AND TRADEMARK OFFICE
CERTIFICATE OF CORRECTION

PATENT NO. : 6,045,047

DATED : April 4, 2000

INVENTOR(S) : Pidhirny et al.

It is certified that error appears in the above-identified patent and that said Letters Patent is hereby corrected as shown below:

On the Title Page

Item [54] HAND-HELD TWO-DIMENSIONAL SYMBOLOGY READER HAVING A FOCUSSING GUIDE

Signed and Sealed this

Twenty-seventh Day of March, 2001

Attest:

NICHOLAS P. GODICI

Attesting Officer

Acting Director of the United States Patent and Trademark Office